United States Patent
Shao et al.

(10) Patent No.: US 9,882,818 B2
(45) Date of Patent: Jan. 30, 2018

(54) ADJUSTING A JITTER BUFFER BASED ON INTER ARRIVAL JITTER

(71) Applicant: Apple Inc., Cupertino, CA (US)

(72) Inventors: Tiange Shao, Santa Clara, CA (US); Onur E. Tackin, Sunnyvale, CA (US); Oren M. Elrad, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 352 days.

(21) Appl. No.: 14/500,059

(22) Filed: Sep. 29, 2014

(65) Prior Publication Data

US 2015/0092585 A1   Apr. 2, 2015

Related U.S. Application Data

(60) Provisional application No. 61/884,540, filed on Sep. 30, 2013.

(51) Int. Cl.
*H04L 1/00*       (2006.01)
*H04L 12/26*      (2006.01)
*H04L 12/853*     (2013.01)
*H04W 28/02*      (2009.01)
*H04L 12/875*     (2013.01)
(Continued)

(52) U.S. Cl.
CPC ........ *H04L 47/2416* (2013.01); *H04L 43/087* (2013.01); *H04L 47/283* (2013.01); *H04L 47/564* (2013.01); *H04L 65/80* (2013.01); *H04W 28/0236* (2013.01); *H04L 43/0835* (2013.01); *H04L 65/608* (2013.01); *H04W 4/008* (2013.01)

(58) Field of Classification Search
CPC ... H04L 43/0835; H04L 65/608; H04L 65/80; H04L 47/2416; H04L 47/283; H04L 47/564; H04L 43/087; H04L 43/106; H04W 4/008; H04W 28/0236; H04W 24/08; H04W 28/0268
See application file for complete search history.

(56) References Cited

U.S. PATENT DOCUMENTS 6,678,267 B1 * 1/2004 Anandakumar ...... H04L 12/413
                                               370/356
8,626,875 B2   1/2014 Viveganandhan et al.
(Continued)

FOREIGN PATENT DOCUMENTS

| EP | 2009820     | 12/2008 |
|----|-------------|---------|
| WO | 2007035147  | 3/2007  |
| WO | 2014067540  | 5/2014  |

*Primary Examiner* — Yemane Mesfin
*Assistant Examiner* — Abdelillah Elmejjarmi
(74) *Attorney, Agent, or Firm* — Meyertons Hood Kivlin Kowert & Goetzel, P.C.; Jeffrey C. Hood (57) ABSTRACT

This disclosure relates to adjusting a jitter buffer at a wireless device based on inter-arrival-jitter (IAJ). In one embodiment, an IAJ value may be calculated for each of multiple received packets. An IAJ distribution may be generated for the received packets. A target packet loss rate may be determined. A quality of service value for IAJ distributions corresponding to the target packet loss rate may be determined. A de-jitter delay value may be calculated based on the IAJ distribution and the quality of service value for IAJ distributions. The de-jitter delay value may be used to adjust the jitter buffer at the wireless device.

17 Claims, 8 Drawing Sheets

(51) Int. Cl.
    *H04L 12/841*    (2013.01)
    *H04L 29/06*    (2006.01)
    *H04W 4/00*    (2009.01)

(56) References Cited

U.S. PATENT DOCUMENTS

| | | | |
|---|---|---|---|
| 2004/0071095 A1* | 4/2004 | Raisanen | H04L 12/24 370/252 |
| 2010/0220615 A1* | 9/2010 | Enstrom | H04L 29/06027 370/252 |
| 2011/0187926 A1* | 8/2011 | Kim | H04N 7/00 348/497 |
| 2013/0282871 A1 | 10/2013 | Jung et al. | |
| 2015/0350099 A1* | 12/2015 | Sun | H04L 65/80 370/412 |

* cited by examiner

| # | RTPTS | Arrive | IAJ |
|---|---|---|---|
| 0 | 0 | 0 | |
| 1 | 320 | 32 | 32-20=12 |
| 2 | 640 | 41 | 9-20=-11 |
| 3 | 960 | 68 | 27-20=7 |
| 4 | 1280 | 101 | 33-20=13 |

ADJUSTING A JITTER BUFFER BASED ON INTER ARRIVAL JITTER

PRIORITY CLAIM

The present application claims benefit of priority to U.S. Provisional Application No. 61/884,540 titled "Adjusting a Jitter Buffer based on Inter Arrival Jitter" and filed on Sep. 30, 2013, whose inventors are Tiange Shao, Onur E. Tackin, and Oren M. Elrad, which is hereby incorporated by reference in its entirety as though fully and completely set forth herein.

FIELD OF THE DISCLOSURE

The present application relates to wireless communication, and more particularly to a system and method for adjusting a jitter buffer based on inter-arrival-jitter (IAJ).

DESCRIPTION OF THE RELATED ART

Wireless communication systems are rapidly growing in usage. Further, wireless communication technology has evolved from voice-only communications to also include the transmission of data, such as Internet and multimedia content. There now exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others. As one aspect of the evolution of wireless communication technology, many voice applications or sessions are performed over a packet based networks.

The dynamic nature of scheduling in packet-switched networks, as well as potential variability resulting from retransmissions and inter-cell handover in some wireless (e.g., cellular) systems, may contribute significant jitter to packet switched voice service. While de jitter algorithms and play-out buffers are used to combat this jitter, existing techniques are subject to significant drawbacks. Accordingly, improvements in the field would be desirable.

SUMMARY

This document describes, inter alia, methods for adjusting a jitter buffer based on inter arrival jitter (IAJ) time, and wireless devices configured to implement the described methods.

For example, the techniques described herein may include features for enabling a wireless device to determine a de jitter delay value for use in packet-switched wireless communication which corresponds to a target packet loss rate and quality of service value appropriate to an application utilizing the packet switched wireless communication of the wireless device. The de jitter delay value may be calculated by the wireless device on the basis of the inter-arrival jitter of recently received packets, and/or more particularly from an IAJ distribution of those recently received packets.

Use of IAJ in calculating the de jitter delay value may be advantageous, among various reasons, since determining IAJ values for received packets may be calculable by a wireless device without the need for synchronization between transmitter and receiver clocks or other external information, such as might be required if absolute network delay or other such metrics were used to calculate a de jitter delay value.

The techniques described herein may be implemented in and/or used with a number of different types of devices, including but not limited to, cellular phones, tablet computers, portable media players, wearable devices, and various other devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description is considered in conjunction with the following drawings.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device") or Mobile Station—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPod™), wearable devices, laptops, tablets (e.g., iPad™, Android™-based tablets), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
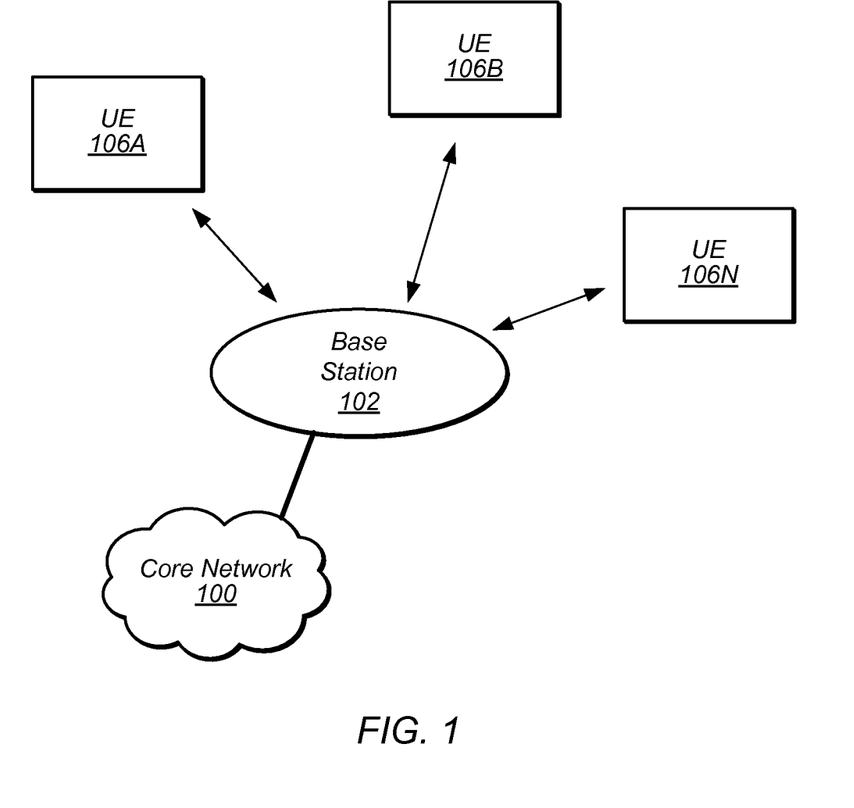
FIG. 1 illustrates an exemplary (and simplified) wireless communication system, according to one embodiment.
Figure 2:
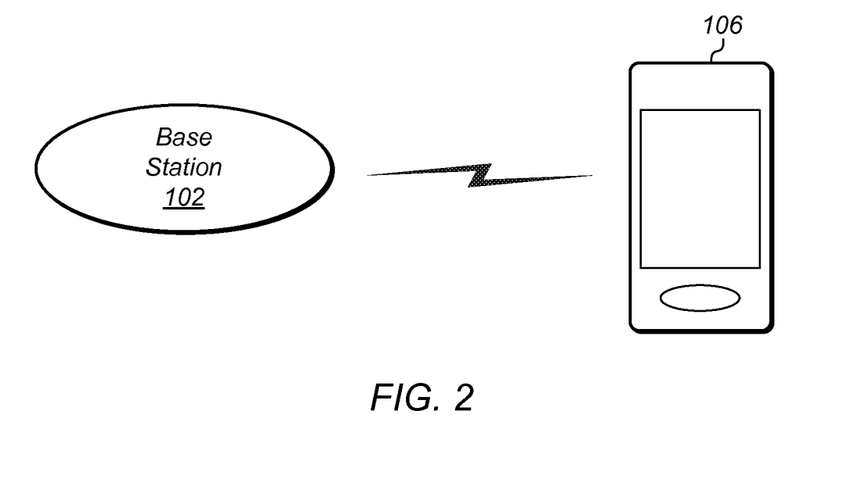
FIG. 2 illustrates a base station (BS) in communication with user equipment (UE) device, according to one embodiment.

FIGS. 1-2—Communication System

FIGS. 1 and 2 illustrate an exemplary (and simplified) wireless communication system, according to one embodiment. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices or mobile stations 106A, 106B, etc., through 106N. Each of the user devices may be referred to herein as a "user equipment" (UE). Thus, the user devices are referred to as UEs or UE devices.

The base station 102 may be a base transceiver station (BTS), base station controller (BSC), evolved node B (eNB), etc. The base station may be housed within a cell tower, e.g., among one or more other base stations. The base station 102 may include hardware that enables wireless communication with the UEs 106A through 106N. The UE 106 and the cellular base station 102 may communicate using any of various cellular communication technologies such as GSM, UMTS (associated with, for example, WCDMA or TD-SCDMA air interfaces), LTE, LTE-Advanced (LTE-A), HSPA, 3GPP2 CDMA2000 (e.g., 1×RTT, 1×EV-DO, HRPD, eHRPD), etc.

As shown, the cellular base station may be equipped to communicate with a network 100 (e.g., a core network of a cellular service provider, a telecommunication network such as a public switched telephone network (PSTN), and/or the Internet, among various possibilities). Thus, the base station 102 may facilitate communication between UEs 106 and/or between the UEs 106 and the network 100. In particular, the cellular base station 102 may provide UEs 106 with various telecommunication capabilities, such as voice, SMS and/or data services.

In some embodiments, the base station may be a multi-mode base station which is configured to support multiple wireless communication technologies (e.g., LTE and CDMA). Alternatively, there may be multiple base stations supporting respective wireless communication technologies, e.g., that are coupled to the same core network 100, although multiple core networks are also envisioned. For example, one of the mobile stations 106 may communicate with two different base stations using two different communication technologies within the same cell.

A UE 106 may be capable of communicating using multiple wireless communication standards. For example, the UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (associated with, for example, WCDMA or TD-SCDMA air interfaces), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates a UE device 106 (e.g., UE device 106A illustrated in FIG. 1) in communication with the cellular base station 102, according to one embodiment. The UE 106 may be a device with wireless network connectivity such as a mobile phone, a hand-held device, a computer or a tablet, or virtually any type of wireless device.

The UE 106 may include a processor that is configured to execute program instructions stored in memory. The UE 106 may perform any of the methods embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In one embodiment, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
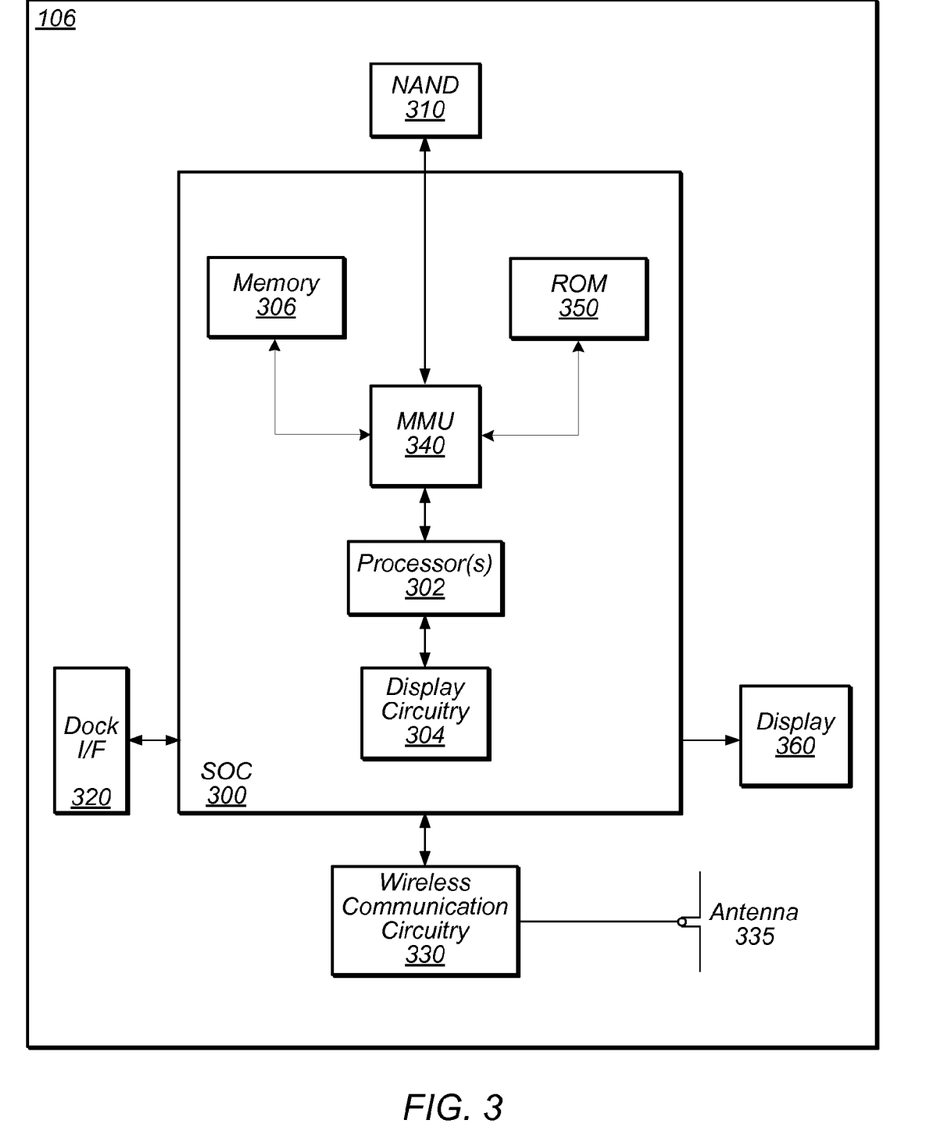
FIG. 3 illustrates an exemplary block diagram of a UE device, according to one embodiment.

FIG. 3—Exemplary Block Diagram of a User Equipment Device

FIG. 3 illustrates an exemplary block diagram of a UE 106, according to one embodiment. As shown, the UE 106 may include a system on chip (SOC) 300, which may include portions for various purposes. For example, as shown, the SOC 300 may include processor(s) 302 which may execute program instructions for the mobile station 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be included as a portion of the processor(s) 302.

As also shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, CDMA2000, Bluetooth, Wi-Fi, GPS, etc.).

As noted above, the UE 106 may be configured to communicate wirelessly using multiple wireless communication standards. As further noted above, in such instances, the wireless communication circuitry 330 may include radio components which are shared between multiple wireless communication standards and/or radio components which are configured exclusively for use according to a single wireless communication standard. As shown, the UE device 106 may include at least one antenna 335 (and possibly multiple antennas, e.g., for MIMO and/or for implementing different wireless communication technologies, among various possibilities), for performing wireless communication with base stations, access points, and/or other devices. For example, the UE device 106 may use antenna 335 to perform the wireless communication.

The UE 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

Figure 8:
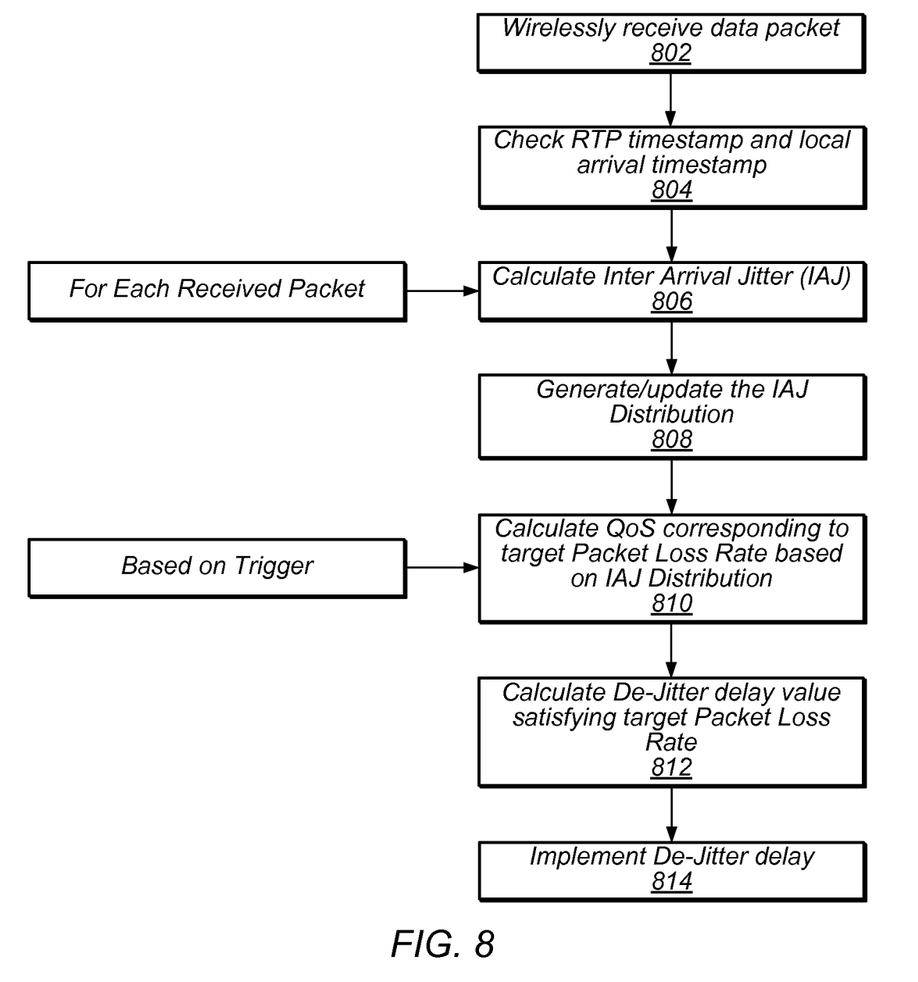
FIG. 8 is a flowchart diagram illustrating a method for adjusting a jitter buffer based on inter arrival jitter, according to one embodiment.

As described herein, the UE 106 may include hardware and software components for implementing features for adjusting a jitter buffer based on inter arrival jitter, such as those described herein with reference to, inter alia, FIG. 8. The processor 302 of the UE device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 8.

FIGS. 4-7—Theoretical Basis for IAJ Based De-Jitter Delay Calculation

FIGS. 4-7 describe a theoretical basis for utilizing an inter arrival jitter (IAJ) based algorithm for calculating a de jitter delay. Note that FIGS. 4-7 and the following corresponding description thereof is provided for illustrative purposes, are provided by way of example only, and are not intended to be limiting to the disclosure as a whole.

Because of the jitter contributions which may be introduced to voice streams over LTE as a result of the dynamic nature of LTE scheduling, retransmissions, and inter-cell handover, among various considerations, de-jitter algorithms may be highly important for a VoLTE receiver. The concept of a "play-out buffer", which may be used to buffer incoming voice packets according to a play out algorithm in order to combat jitter, may be an important aspect of a de-jitter algorithm.

The voice quality over LTE may be mainly affected by the end-to-end delay and the packet-loss-rate. Of existing de-jitter algorithms, three kinds may be differentiated. The first kind may rely on estimation of network delay statistics to eliminate delay variation, regardless of quality of service. The second kind may utilize network delay statistics to set the total end-to-end delay to avoid high packet loss rate, and thus to achieve an expected quality of service. The third kind may utilize a quality model of evaluating the impact of both packet loss and delay to find a buffer setting that maximizes the expected quality.

Of these types of algorithms, the first type may typically overestimate the size of buffer needed, because it does not take into account that telephony applications may be able to tolerate a certain amount of late packets, e.g., using loss concealment techniques. The second and third types both utilize the concept of targeted quality of service (QoS); the second type provides a way to control the trade-off between packet loss and the delay by simply discarding certain number of packets, while the third type may attempt to optimize this trade-off process by exploring the quantitative relationship between QoS and the packet loss and delay.

All of these algorithms depend on computing the network delay, which is a significant challenge in a realistic real-time system. Assuming synchronization between source and receiver clocks, packets time-stamps indicating when a packet is produced at a transmitter and when it arrives at a receiver would enable computation of the network delay suffered by the packets. However, synchronization among distributed hosts is difficult, and inaccurate synchronization may lead to clock offset and skew, and which may introduce linearly increased errors into network delay calculations/estimations.

Thus, although the absolute network delay might be an excellent metric for de-jitter algorithms if it were possible to accurately calculate, because of the difficulty of maintaining synchronization between transmitter and receiver clocks, an alternative metric may be preferable for use in a de jitter algorithm.

Since without synchronization, the clock offset between the transmitter and receiver makes it impossible to calculate the actual network delay, in practice, the network delay variance may be used instead of actual network delay. The network delay variance may be calculated as the difference between a reference network delay and the instantaneous network delay suffered by each packet. As a result, the clock offset is removed during the subtraction. The reference point can be chosen as the minimum observed network delay, or the average of the observed network delay. In order to keep accuracy, the reference point may be updated every 200 ms (as one possibility).

Besides the actual network delay variance, another metric of jitter level (network delay variation) may be based on the difference in arrival time for two consecutive packets, which may be referred to as inter arrival jitter (IAJ) in the specification of the RTP Control Protocol (RTCP). The metric of inter arrival jitter may be advantageous in terms of implementation in that the calculation is based on quantities known to the receiver and can be calculated exactly.

Accordingly, it may be advantageous to implement a de jitter buffer algorithm which is based on inter arrival jitter, and which calculates the optimal de jitter delay subjected to an expected quality of voice/QoS.

The inter-arrival-jitter or IAJ may be defined as the difference of transit time between two consecutive packets, and is not affected by any clock offset between transmitter and receiver. The information used to calculate the inter arrival jitter may be obtained from RTP time stamps and the system arrival times of two consecutive packets at the receiver. In the algorithm described herein, the relationship between the network delay and IAJ may enable mapping of the probability of the largest tolerable network delay to the probability of largest tolerable inter arrival jitter.

In the concord algorithm, the probability of the largest tolerable network delay is equal to the packet success rate (PSR). The corresponding probability of IAJ is defined herein as the QoS value, $P_{QoS}$. Once the corresponding $P_{QoS}$ of a PSR is found, the same de jitter delay using IAJ can be found as would be found using absolute network delay.

Figure 4:
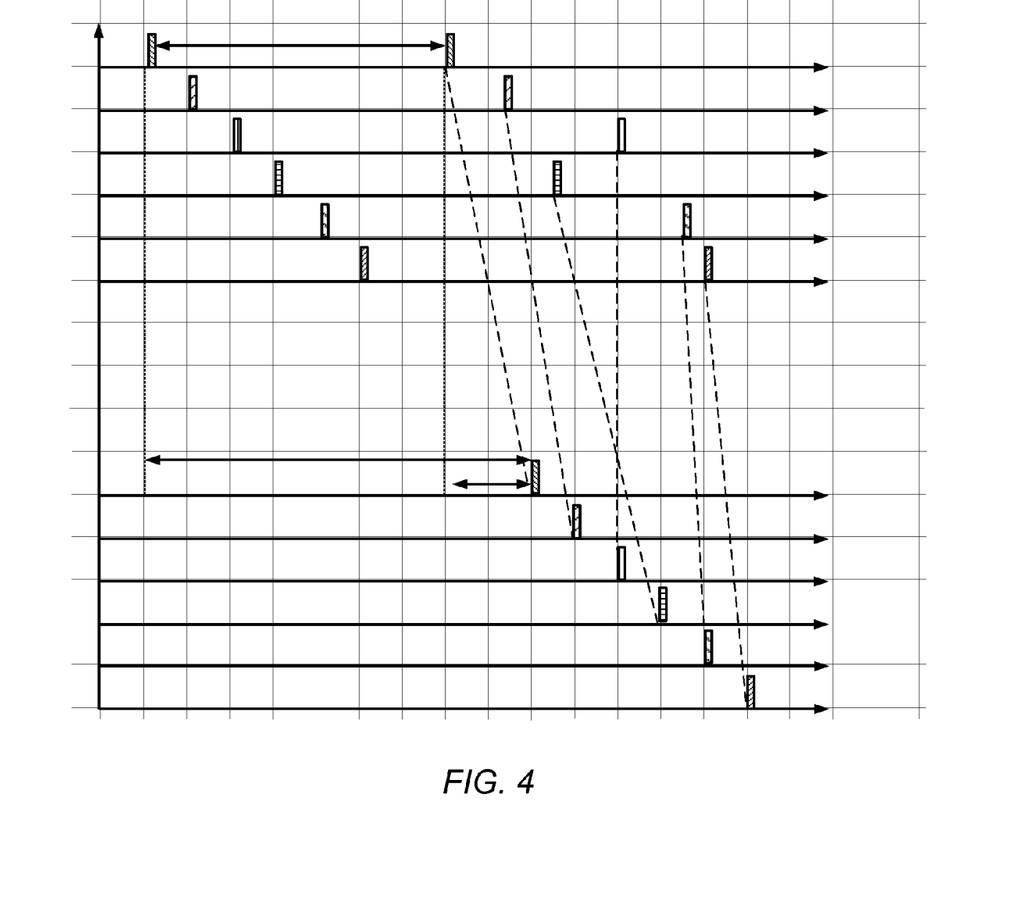
FIGS. 4-5 illustrate aspects of an exemplary stream synchronization technique, according to one embodiment.

Single stream synchronization may be used to remove delay variance from a stream. FIG. 4 illustrates, for such a conceptual synchronization, the transmitted packets at the transmitter, the arrived packets (with various delay variances) at the receiver, and packet play-out timing after buffering at the player. Different shading patterns are used to represent different packets.

Figure 5:
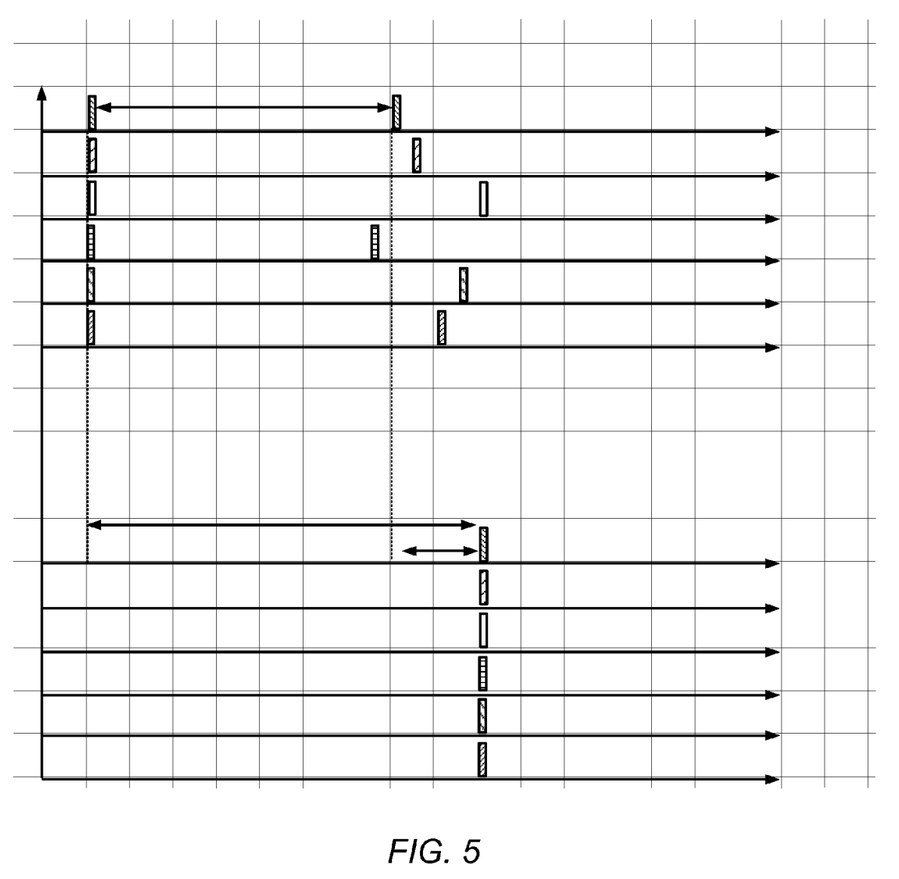

To facilitate understanding of jitter buffer related concepts, FIG. 5 illustrates a similar scenario as FIG. 4, but with the transmitting interval removed (e.g., as if all the packets were transmitted at the same time) such that only the network delay each packet suffers is shown. The purpose of buffering incoming packets may be to introduce an additional (e.g., de-jittering) delay to meet the synchronization requirements at the player.

The network delay of the kth packet may be defined as:

$$n_k = a_k - t_k, \quad (1.1)$$

where $a_k$ is arrival time of kth packet at the receiver, and $t_k$ is the transmitted time of kth packet at the transmitter. The value of $t_k$ is contained in RTP timestamp of kth packet.

The inter arrival jitter may be defined as:

$$z_k = (a_k - a_{k-1}) - (t_k - t_{k-1}). \quad (1.2)$$

The equation (0.2) can also be expressed as $$z_k = (a_k - a_{k-1}) - (t_k - t_{k-1}) = (n_k - n_{k-1}). \quad (1.3)$$

Consider now the inter arrival jitter distribution, which may be explored using mathematical methods from the network delay distribution. Let inter arrival jitter and the network delays of the consecutive packets be denoted as as z, x, and y, respectively. Their probability density functions (PDFs) may be defined as $f_Z(z)$, $f_X(x) = f_Y(y)$, and $f_Y(y)$ accordingly. The joint PDF of x and y may be defined as $f_{X,Y}(x,y)$. For the network delay suffered by consecutive packets being independent and obeying the same distribution, the following expressions may be obtained:

$$f_{X,Y}(x,y)=f_X(x)f_Y(y), \text{ and} \quad (1.4)$$

$$f_X(x)=f_Y(y). \quad (1.5)$$

Note that $f_Z(z)$ may be derived from $f_X(x)$ in the following equation.

$$\begin{aligned} F_Z(z) = P(Z < z) &= \int_{-\infty}^{z} f_Z(u) du \\ &= \int_{-\infty}^{\infty} \int_{-\infty}^{x+z} f_{X,Y}(x,y) dy \, dx \\ &= \int_{-\infty}^{\infty} \int_{-\infty}^{x+z} f_X(x) f_Y(y) dy \, dx \\ &= \int_{-\infty}^{\infty} F_Y(x+z) f_X(x) dx \end{aligned} \quad (1.6)$$

Taking the derivative of z, the probability density function of z may be obtained:

$$f_Z(z) = \int_{-\infty}^{\infty} f_Y(z+x) f_X(x) dx. \quad (1.7)$$

Thus, using equation (1.7), it may be seen that:

$$f_Z(z) = \int_{-\infty}^{\infty} f_X(z+x) f_X(x) dx. \quad (1.8)$$

Equation (1.8) shows that $f_Z(z)$ is the auto-correlation of $f_X(x)$.

Consider next how to estimate the probability density function of delay from the probability density function of inter-arrival-jitter. A de-correlation method may be used to estimate $f_X(x)$ from $f_Z(z)$. The Fourier transform of $f_X(x)$ and $f_Z(z)$ may be denoted as $$\hat{f}_Z(\omega) = \int_{-\infty}^{\infty} f_Z(z) e^{iz\omega} dz \quad (1.9)$$

$$\hat{f}_X(\omega) = \int_{-\infty}^{\infty} f_X(x) e^{ix\omega} dx. \quad (1.10)$$

The equation (1.8) can be re-written as $$\begin{aligned} f_Z(z) &= \int_{-\infty}^{\infty} f_X(z+x) f_X(x) dx \\ &= \int_{-\infty}^{\infty} f_X(-z+x) f_X(x) dx = f_X(z) \otimes f_X(-z). \end{aligned} \quad (1.11)$$

Taking the Fourier Transform on both sides, $$\hat{f}_Z(\omega)=\hat{f}_X{}^*(\omega)\hat{f}_X(\omega)=|\hat{f}_X(\omega)|_2{}^2. \quad (1.12)$$

A solution of equation (1.12) can be found using linear estimation:

$$\hat{f}_X(\omega)=g(\hat{f}_Z(\omega)); \quad (1.13)$$

Subsequently, using an inverse FFT, the following expression may be obtained:

$$f_X(x)=G(f_Z(z)). \quad (1.14)$$

By using equations (1.17) and (1.14), $f_X(x)$ may be obtained from $f_Z(z)$:

$$\int_{d_B-B}^{d_B} f_Z(z) dz \leq P_{Qos}.$$

For a loss-tolerant algorithm, such as the concord algorithm, the target packet loss rate may be defined as PLR, the fraction of packets discarded at the receiver. The packet success rate may be defined as:

$$\text{PSR}=1-\text{PLR}. \quad (1.15)$$

For every packet, total end-to-end delay (TED) may be defined as the sum of the network delay, $n_k$ and the de jitter delay, $d_{B,k}$:

$$d_{TED}=n_k+d_{B,k}. \quad (1.16)$$

Note that it may be desirable that for every packet k, the TED $d_{TED}$ be kept the same.

By using the probability density function of network delay, $f_X(x)$, the relationship between the expected TED and the packet loss may be:

$$F_X(d_{TED}) = \int_{-\infty}^{d_{TED}} f_X(x) dx \geq PSR. \quad (1.17)$$

Note that it may further be desirable that the chosen $d_{TED}$ not exceed the maximum acceptable delay a packet can suffer. As one example, this maximum delay may be set to be 200 ms; other examples are also possible.

Once the total end-to-end delay, $d_{TED}$, has been identified, the buffer controller may be designed. As one example, a talk-spurt-based controller may be designed such that the first packet of a new talk spurt will be delayed $d_{B,k}$ after it arrives. In this case, that packet would be played at the time $p_k$:

$$p_k=a_k+d_{B,k}=t_k+n_k+d_{B,k} \quad (1.18)$$

The successive jth packet in same talk spurt may be played at the time:

$$p_{k+j}=a_k+(t_{k+j}-t_k)+d_{B,k}. \quad (1.19)$$

Replacing equation (1.1) in (1.19), it may be seen that:

$$p_{k+j}=n_k+t_{k+j}d_{B,k} \quad (1.20)$$

Further, from equation (1.16), the expected buffering delay for the kth packet may be:

$$d_{B,k}=d_{TED}-n_k. \quad (1.21)$$

Taking the expectation of both sides of equation (1.21), the following expression may be obtained:

$$E[d_{B,k}]=d_{TED}-E[n_k], \quad (1.22)$$

where $E[d_{B,k}]$ and $E[n_k]$ denote the mean of $d_{B,k}$ and $n_k$ respectively.

In a relative-network-delay-based algorithm, the de jitter delay for the first packet of a talk spurt might be chosen as:

$$d_B=E[d_{B,k}]. \quad (1.23)$$

However, by using the inter-arrival-delay, it may be possible to find the optimum de jitter delay $d_B$ directly (e.g., instead of finding the optimum total end-to-end delay $d_{TED}$).

Similar to the concord algorithm, the optimal de jitter delay subject to a target QoS may be solved by $$\min d_B \quad (1.24)$$
$$\text{s.t.} \int_{B-d_B}^{d_B} f_Z(z)\,dz \geq P_{Qos}.$$

Under the condition that the total buffer size is sufficiently long that the probability that $z \leq -B$ may be ignored, the equation (1.24) may be re-written as $$\min d_B \quad (1.25)$$
$$\text{s.t.} \int_{-\infty}^{d_B} f_Z(z)\,dz \geq P_{Qos}.$$

Given the same network conditions, buffering mechanisms, and de jitter delays, the same PLR may be obtained. Thus, in order to obtain the same de jitter delay as a network-delay-based algorithm, the corresponding value of $P_{QoS}$ may be calculated for an IAJ-based algorithm, in order to guarantee the same PLR.

However, first consider the statistic relationship between the probability distribution functions of network delay and inter arrival delay. The network delay of every packet may be considered to be independent, meaning that the equations (1.26) and (1.27) may hold regardless of network conditions.

$$E[Z]=E[X]-E[Y]=0, \quad (1.26)$$

$$V[Z]=V[X]+V[Y]=2V[X]. \quad (1.27)$$

As it turns out, the optimum de jitter delay may be determined by the shape of the PDF tail. Accordingly, it may be preferable to shift the $f_X(x)$ to the origin point, e.g., in order to simplify mapping PLR to the value of $P_{QoS}$. From the equations (0.27) and (0.28), it may be appropriate to left shift $f_X(x)$ by $E[X]$, in order to make $f_X(x)$ and $f_Z(z)$ both centered over the origin point. Referring back to equations (1.22) and (1.23), the equation (1.17) can be expressed by the shifted $f_X(x)$:

$$F_X(d_{TED}) = \int_{-\infty}^{d_B} f_X(x - E[X])\,dx \geq PSR. \quad (1.28)$$

With the same $d_B$, the corresponding $P_{QoS}$ which would lead to same value of PSR may be calculated based on inter-arrival delay:

$$P_{Qos} = F_Z(d_B) = \int_{-\infty}^{d_B} f_Z(z)\,dz \quad (1.29)$$

As a result, the equations (1.28), (1.29), and (1.8) could map the PSR to the value of $P_{QoS}$.

Example of Network Delay Following Gaussian Distribution

In an LTE network, each packet may travel by an independently selected path. By the central limit theorem, the distribution of network delay may follow a normal distribution. Suppose, for example, that x obeys a Gaussian distribution as:

$$f_X(x) = \frac{1}{\sqrt{2\pi\sigma^2}}\exp\left(\frac{-(x-\mu)^2}{2\sigma^2}\right), \quad (1.30)$$

where $\mu$ is the mean and $\sigma^2$ is the variance.

By using equation (1.8), the probability of z (also following a Gaussian distribution) may be obtained:

$$f_Z(z) = \frac{1}{\sqrt{4\pi\sigma^2}}\exp\left(\frac{-(z)^2}{4\sigma^2}\right). \quad (1.31)$$

Figure 6:
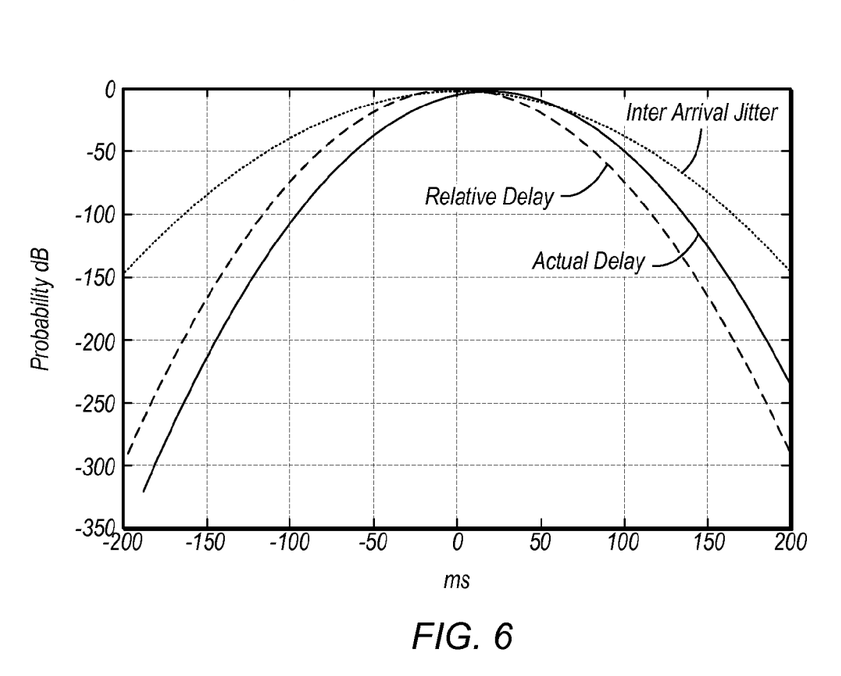
FIG. 6 illustrates a probability distribution function correlating relative delay, actual delay, and inter-arrival jitter, according to one embodiment.

FIG. 6 shows the log of $f_X(x)$, $f_X(x-\mu)$, and $f_Z(z)$ under an assumption of a Gaussian distribution. As shown, the curve of $f_Z(z)$ has higher tail than that of $f_X(x)$. With the same $d_B$, the value of $P_{QoS}$ may always be larger than 1-PLR.

By using the equation (1.30), the total end-to-end delay may be obtained as:

$$d_{TED}=F^{-1}(PLR)=\mu+\sigma\sqrt{2}\mathrm{erf}^{-1}(2PLR-1), \quad (1.32)$$

where erf is the well known error function.

By using the equation (1.31), the de jitter delay may be obtained as:

$$d_B=F^{-1}(P_{Qos})=\sigma\mathrm{erf}^{-1}(2P_{Qos}-1). \quad (1.33)$$

Combining the equations (1.32), (1.33), and (1.22), the following expression may be obtained:

$$\mu+\sigma\sqrt{2}\mathrm{erf}^{-1}(2PLR-1)=\sigma\mathrm{erf}^{-1}(2P_{Qos}-1)-\mu.$$

The value of $P_{QoS}$ may thus be expressed as a function of PLR under Gaussian assumption as:

$$P_{Qos}=0.5+0.5\mathrm{erf}(\sqrt{2}\mathrm{erf}^{-1}(2PLR-1)) \quad (1.34).$$

Figure 7:
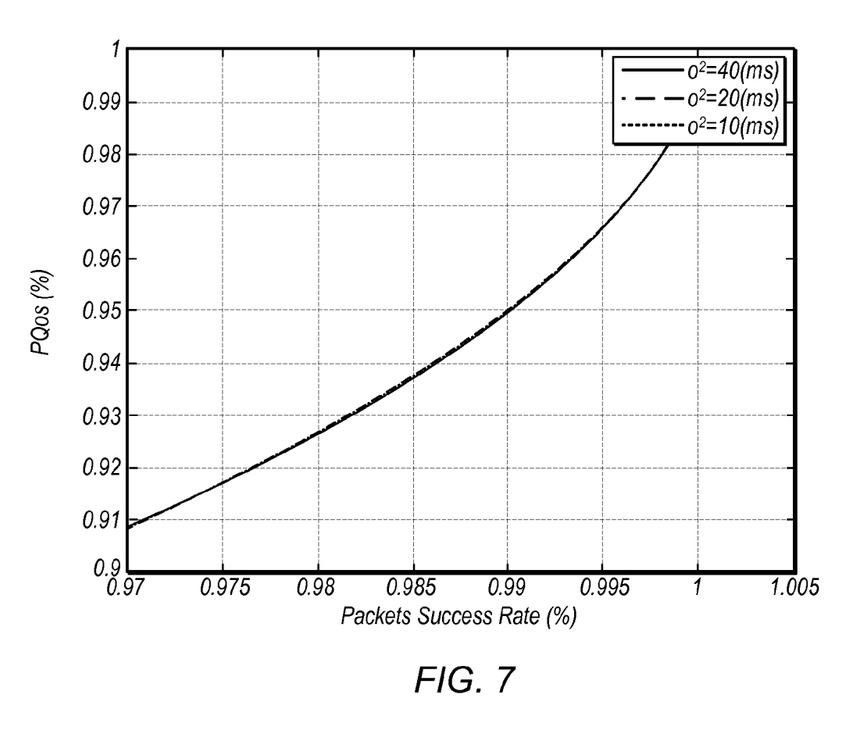
FIG. 7 illustrates a relation between a $P_{QoS}$ metric and a packet success rate metric, according to one embodiment.

The equation (1.34) demonstrates that $P_{QoS}$ and PLR have a one-to-one correspondence. This mapping is independent of the mean and variance. FIG. 7 plots the curve of $P_{QoS}$ with respect to PLR for such a Gaussian distribution.

FIGS. 8-12—Flowchart and Accompanying Figures

FIG. 8 illustrates an exemplary method, e.g., performed by a mobile station/user equipment (UE) device, for adjusting a jitter buffer based on inter arrival jitter. The method may be used in conjunction with a real-time application, such as a voice calling application (potentially including a VoLTE application), a video chat or videoconferencing application, or any of various other possible real-time media presentation applications. The method shown in FIG. 8 may be used in conjunction with any of the computer systems or devices shown in the above Figures, among other devices. In various embodiments, some of the method elements shown may be performed concurrently, in a different order than shown, or may be omitted and/or considered optional. Additional method elements may also be performed as desired. As shown, this method may operate as follows.

In 802, the UE may wirelessly receive a plurality of data packets (e.g., audio data packets or other types of data packets). The UE may perform wireless communication to receive the data packets using any of various desired wireless communication technologies, including but not limited to GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, etc.

In 804, for each arriving packet, a transmission timestamp may be read. The transmission timestamp may, for example, be an RTP (real-time transfer protocol) timestamp. Additionally, the local arrival timestamp of each packet may be noted.

Figure 9:
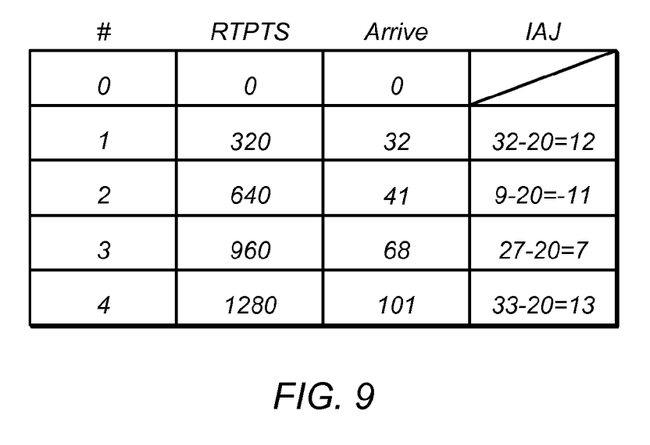
FIG. 9 illustrates an exemplary inter arrival jitter calculation, according to one embodiment.

Given this information, in 806, for each respective packet, the inter arrival jitter (IAJ) may be calculated. As one possibility, this may include subtracting a real-time transport protocol (RTP) timestamp of a previously received (e.g., sequentially preceding) packet from a RTP timestamp of the respective received packet, resulting in a RTP timestamp difference, subtracting a packet arrival timestamp of the previously received packet from a packet arrival timestamp of the respective received packet, resulting in a packet arrival timestamp difference, and subtracting the RTP timestamp difference from the packet arrival timestamp difference, resulting in an IAJ value for the respective received packet FIG. 9 illustrates such an exemplary calculation of inter-arrival-jitter using an RTP timestamp and a local arrival timestamp. As shown, sequential packets may be transmitted by a sender at certain (e.g., regular) intervals. In the case of an RTP timestamp, the value may be divided by 16 to correspond to the packet arrival timestamp. Thus, as shown, for the first packet, the IAJ may be (32−0)−((320−0)/16)=12.

For the second packet, the IAJ may be (41−32)−((640−320)/16)=−11.

Similar calculations may yield an IAJ for the third packet of 7, and an IAJ for the fourth packet of 13.

In 808, the IAJ values calculated for each packet may be used to generate and/or update an IAJ distribution, which tracks the distribution of IAJ values of recently received packets. Generating the IAJ distribution may be performed once an initial threshold (e.g., a time window or minimum number of data points) has been met for a given application data stream. Once generated, the IAJ distribution may then be maintained with the addition of newly calculated IAJ values as already noted, and in some cases may additionally may be updated to remove older IAJ values. For example, the IAJ distribution may be maintained such that a certain (e.g., predetermined or dynamically adjustable) window size is used, and once the number of data points in the distribution is greater than the selected window size, older data points may 'age out' and be removed such that the window size remains constant or relatively constant. As another possibility (e.g., as an alternative or additional constraint), data points older than a certain time threshold may be removed to keep the distribution relevant to recent network conditions (e.g., independent of or in conjunction with data point window size considerations).

Figure 10:
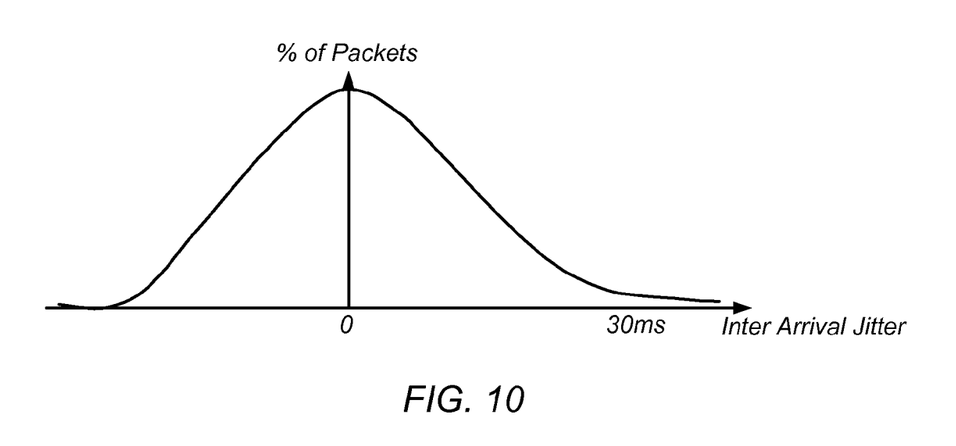
FIG. 10 illustrates an exemplary inter arrival jitter probability distribution function, according to one embodiment.

FIG. 10 illustrates an exemplary such IAJ distribution which might be generated. As shown, the distribution may have an approximately normal (e.g., Gaussian) distribution (though irregularities due to real-world considerations and/or sample size may be present in the distribution), where the peak percentage of packets may be received with an IAJ of approximately zero.

To guarantee a certain QoS (e.g., based on the application type, such as voice/VoIP/VoLTE, video, or other real-time application), a certain packet loss rate may be determined to be tolerable. For example, as one possibility, a target packet loss rate of 1% might be selected for a voice call application.

Once this target packet loss rate (and corresponding packet success rate) are selected, in 810 a QoS value for IAJ distributions may be calculated; for example, $P_{QoS}$ may be calculated using equation (1.34) based on the selected target packet loss rate. As previously noted, FIG. 7 also illustrates the mapping curve of the relation between $P_{QoS}$ and packet success rate, which may be used to find the QoS value corresponding to the selected target packet loss rate if desired.

In 812, the wireless device may calculate (or re-calculate) a de jitter delay to use as part of its play-out algorithm using its current (e.g., most recently updated) IAJ distribution. This calculation (or re-calculation) may occur occasionally (e.g., less frequently than at every packet arrival), based on any of various possible (e.g., predefined) trigger conditions. A periodic trigger (e.g., a timer) could be used as one such possible trigger. As another example, the de jitter delay may be calculated once per talkspurt (e.g., at the end of each talkspurt, the beginning of each talkspurt, or on any other desired basis).

Thus, using the IAJ distribution and the correspondence between PSR and $P_{QoS}$, a de jitter delay may be calculated and selected which may be expected to meet/satisfy the desired packet loss rate.

In 814, the selected de jitter delay value may subsequently be implemented in conjunction with presentation of received packets. For example, the selected de jitter delay value may be implemented as part of a playout/playback algorithm associated with an application to which the received packets correspond, such as a voice calling application.

Figure 11:
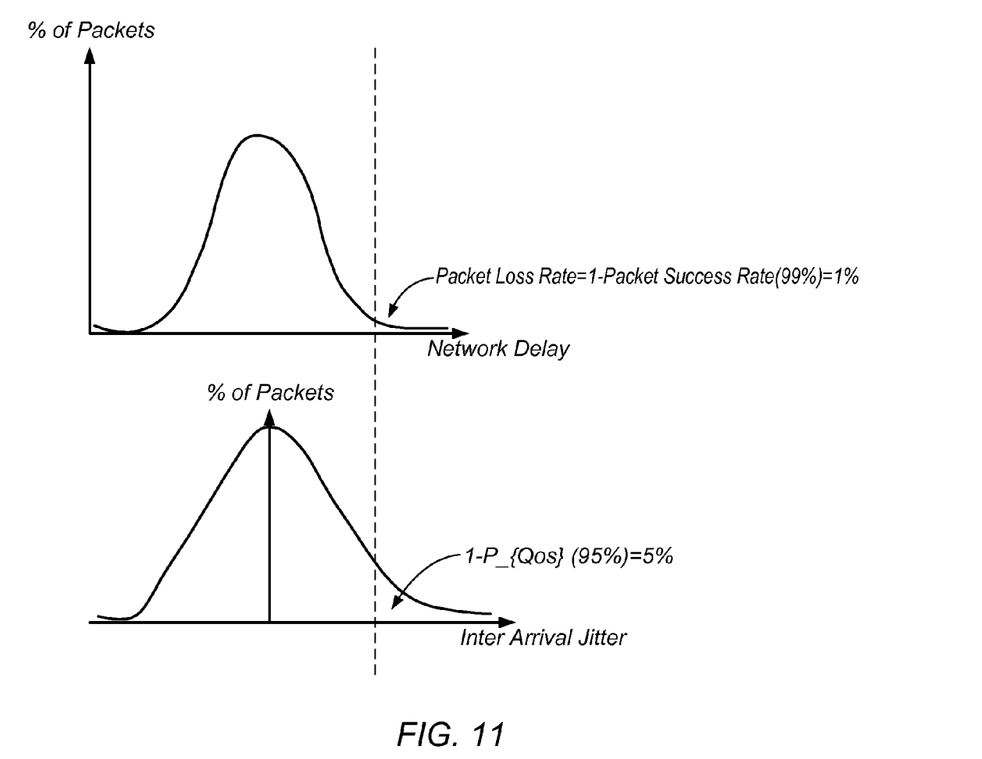
FIG. 11 illustrates corresponding probability distribution functions for inter arrival jitter and network delay, according to one embodiment.
Figure 12:
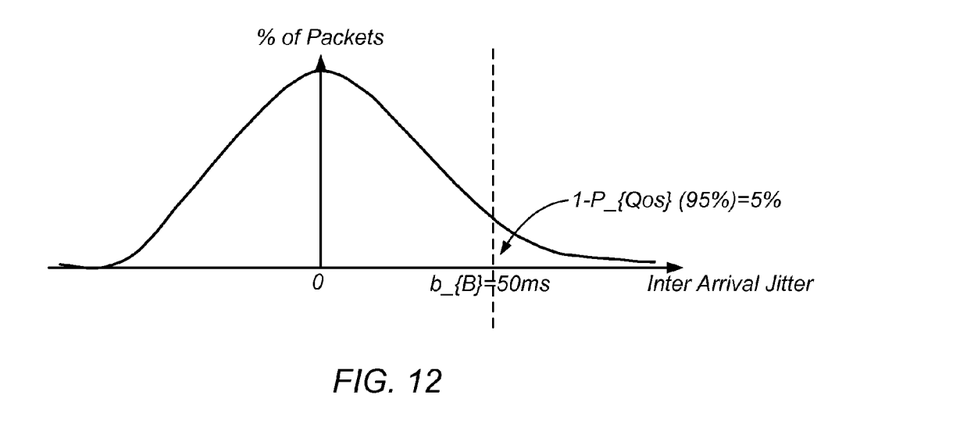
FIG. 12 illustrates an exemplary calculation of a delay buffer length using a probability distribution function of inter arrival jitter, according to one embodiment.

FIGS. 11-12 illustrate this portion of the method of FIG. 8 in one exemplary scenario.

Consider that a packet loss rate of 1% may be considered acceptable in the exemplary scenario. This may in turn correspond to a packet success rate of 99%. Using equation 1.34 and/or the mapping illustrated in FIG. 7, it may be determined that this corresponds to a $P_{QoS}$ of 95%. In turn, using the actual IAJ distribution, a delay value which produces a $P_{QoS}$ of 95% may be calculated. For example, as shown in FIG. 12, it might be determined that a de jitter delay of 50 ms will result in a $P_{QoS}$ of 95%. In this case, a de jitter delay of 50 ms may be selected. This de jitter delay may then be provided as an input to a jitter buffer system until (e.g., on a subsequent occasion, such as after a next talk spurt has ended) a new de jitter delay is calculated. Note that each time a new de jitter delay is calculated, it may be based on a different IAJ distribution (e.g., since the IAJ distribution for a stream ongoing at a mobile station may be continually updated at each new packet arrival), and thus may result in a different de jitter delay even if the same target QoS (and thus the same target PSR and $P_{QoS}$) is used.

Embodiments of the described herein may be realized in any of various forms. For example, the systems and methods described herein may be realized as a computer-implemented method, a computer-readable memory medium, or a computer system. Alternatively, the systems and methods described herein may be realized using one or more custom-designed hardware devices such as ASICs. As another alternative, the systems and methods described herein may be realized using one or more programmable hardware elements such as FPGAs. The systems and methods described herein may also be implemented using any combination of the above.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless user equipment (UE) device, comprising:
    a radio; and
    a processing element;
    wherein the radio and the processing element are configured to:
        wirelessly receive a plurality of audio data packets via the radio, wherein the plurality of audio data packets correspond to a first application of a first application type;
        calculate an inter-arrival-jitter (IAJ) value for each of the plurality of received audio data packets;
        generate an IAJ distribution for the plurality of received audio data packets;
        determine a target packet loss rate for the audio data packets based on the first application type;
        determine a quality of service (QoS) value for use in determining a de-jitter delay value, wherein the QoS value is mapped from the target packet loss rate based on a first probability distribution;
        calculate the de-jitter delay value based on the IAJ distribution generated for the plurality of received audio packets and the QoS value, wherein the de-jitter delay value corresponds to the target packet loss rate, and wherein said calculating the de jitter delay value comprises applying the QoS value to the IAJ distribution to determine the de-jitter delay value;
        perform playback of the received audio data packets, wherein the performing is based at least in part on the de-jitter delay value; and
        performing:
            receiving additional audio data packets of the first application,
            updating the IAJ distribution based on the additional audio data packets,
            recalculating the de-litter delay value by applying the QoS value to the updated IAJ distribution, and
            performing playback using the recalculated de-jitter delay value repeatedly throughout execution of the first application.

2. The UE of claim 1,
    wherein the audio data packets are received as part of a voice call,
    wherein the de-jitter delay value is calculated for each talkspurt of the voice call.

3. The UE of claim 1,
    wherein the IAJ for each respective received audio data packet is calculated based on realtime transport protocol (RTP) timestamps and arrival times at the UE of the respective received audio packet and an audio packet received immediately preceding the respective received audio packet.

4. The UE of claim 1,
    wherein updating the IAJ distribution further comprises removing IAJ values of one or more earlier received audio data packets from the IAJ distribution.

5. The UE of claim 1,
    wherein the audio data packets are received as part of a Voice over LTE (VoLTE) call.

6. A method for a wireless user equipment (UE) device to select a de-jitter delay based on inter-arrival-jitter (IAJ), the method comprising:
    by the UE:
        wirelessly receiving a plurality of packets corresponding to a first application of a first application type;
        calculating an IAJ value for each respective packet of the plurality of received packets;
        generating an IAJ distribution for the plurality of received packets using the IAJ values of the plurality of received packets;
        determining a target packet loss rate for received packets based on the first application type;
        determining a quality of service (QoS) value for use in determining a de-jitter delay value, wherein the QoS value is mapped from the target packet loss rate based on a first probability distribution;
        calculating the de-jitter delay value based on the IAJ distribution generated for the plurality of received audio packets and the QoS, value, wherein the de-jitter delay value corresponds to the target packet loss rate, and wherein said calculating the de jitter delay value comprises applying the QoS value to the IAJ distribution to determine the de-jitter delay value;
        performing playback of the plurality of packets, wherein the performing is based at least in part on the de-jitter delay value; and
        performing:
            receiving additional packets of the first application,
            updating the IAJ distribution based on the additional packets,
            recalculating the de jitter delay value by applying the QoS value to the updated IAJ distribution, and
            performing playback using the recalculated de-jitter delay value repeatedly throughout execution of the first application.

7. The method of claim 6, wherein calculating an IAJ value for a respective received packet comprises:
    subtracting a real-time transport protocol (RTP) timestamp of a previously received packet from a RTP timestamp of the respective received packet, resulting in a RTP timestamp difference;
    subtracting a packet arrival timestamp of the previously received packet from a packet arrival timestamp of the respective received packet, resulting in a packet arrival timestamp difference;
    subtracting the RTP timestamp difference from the packet arrival timestamp difference, resulting in an IAJ value for the respective received packet.

8. The method of claim 6,
wherein updating the IAJ distribution further comprises removing one or more oldest IAJ values from the IAJ distribution to maintain a predetermined maximum number of data points.

9. The method of claim 6,
wherein updating the IAJ distribution further comprises removing one or more IAJ values that are older than a time threshold from the IAJ distribution.

10. The method of claim 6, wherein said re-calculating the de-jitter delay value using the updated IAJ distribution is based on one or more predefined trigger conditions.

11. The method of claim 10,
wherein the plurality of received packets are audio data packets for a voice call,
wherein the one or more predefined trigger conditions comprise a talkspurt of the voice call ending.

12. The method of claim 6,
wherein the plurality of received packets are audio data packets for a voice call,
wherein the target packet loss rate is a maximum acceptable packet loss rate for the voice call.

13. A non-transitory computer-readable memory medium that stores instructions that, when executed at a wireless device, cause the wireless device to:
determine a target packet loss rate for data packets corresponding to a first application based at least in part on a first application type of the first application;
wirelessly receive a plurality of data packets corresponding to the first application type;
calculate an inter-arrival-jitter (IAJ) value for each of the plurality of received data packets;
generate an IAJ distribution for the plurality of received data packets based on the calculated IAJ values;
determine a quality of service (QoS) value for use in determining a de-jitter delay value, wherein the first value is mapped from the target packet loss rate for data packets corresponding to the first application type based on a first probability distribution;
calculate the de-jitter delay value which meets the target packet loss rate for data packets corresponding to the first application type based on the IAJ distribution generated for the plurality of received audio packets and the QoS value, wherein said calculating the de-jitter delay value comprises applying the QoS value to the IAJ distribution to determine the de-jitter delay value;
perform presentation of the plurality of data packets using the de-jitter delay value; and
perform:
wirelessly receiving additional data packets of the first application,
updating the IAJ distribution based on the additional data packets,
recalculating the de-jitter delay value by applying the QoS value to the updated IAJ distribution, and
performing presentation using the recalculated de-jitter delay value repeatedly throughout execution of the first application.

14. The non-transitory computer-readable memory medium of claim 13, wherein the QoS value for use in determining a de-jitter delay value is calculated using the following equation:

$$P_{QoS}=0.5+0.5\mathrm{erf}(\sqrt{2}\mathrm{erf}^{-}(2PLR-1))$$

wherein $P_{QoS}$ represents a QoS value for use in determining the de-jitter delay value, wherein PLR represents a packet loss rate corresponding to that $P_{QoS}$ based on the first probability distribution.

15. The non-transitory computer-readable memory medium of claim 13, wherein updating the IAJ distribution comprises:
removing IAJ values of data packets which have aged out of an IAJ distribution calculation window.

16. The non-transitory computer-readable memory medium of claim 13,
wherein the application type is a real-time audio, video, or audiovisual application.

17. The non-transitory computer-readable memory medium of claim 16,
wherein the IAJ value for each received data packet is calculated based on real-time transport protocol timestamps and local arrival timestamps for the received data packet and a sequentially preceding data packet.

* * * * *